(12) United States Patent
Van Endert

(10) Patent No.: US 11,625,083 B2
(45) Date of Patent: *Apr. 11, 2023

(54) POWER DISTRIBUTION SYSTEM WITH SELF-LEARNING LOW POWER STANDBY REDUCTION

(71) Applicant: PHILIPS LIGHTING HOLDING B.V., Eindhoven (NL)

(72) Inventor: Tony Petrus Van Endert, Lommel (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 96 days.

This patent is subject to a terminal disclaimer.

(21) Appl. No.: 16/125,827

(22) Filed: Sep. 10, 2018

(65) Prior Publication Data

US 2019/0015794 A1 Jan. 17, 2019

Related U.S. Application Data

(62) Division of application No. 15/114,811, filed as application No. PCT/EP2015/050418 on Jan. 12, 2015, now Pat. No. 10,095,257.

(30) Foreign Application Priority Data

Jan. 31, 2014 (EP) ..................... 14153436

(51) Int. Cl.
*G06F 1/3287* (2019.01)
*G06F 1/3206* (2019.01)
(Continued)

(52) U.S. Cl.
CPC .......... *G06F 1/3206* (2013.01); *G06F 1/3287* (2013.01); *H02J 2310/60* (2020.01); *H04L 12/10* (2013.01); *H04L 12/12* (2013.01)

(58) Field of Classification Search
CPC .. G06F 1/3206; G06F 1/3287; H02J 2310/60; H04L 12/10; H04L 12/12; Y02B 70/30; Y04S 20/20
See application file for complete search history.

(56) References Cited

U.S. PATENT DOCUMENTS 6,909,921 B1  6/2005 Bilger
7,478,251 B1  1/2009 Diab
(Continued)

FOREIGN PATENT DOCUMENTS

WO  2010113075 A1  10/2010
WO  2012028979 A1  3/2012
(Continued)

*Primary Examiner* — Eric C Wai

(57) ABSTRACT

The invention relates to a power distribution system (1), especially a Power-over-Ethernet system, comprising at least one dominant sensor, which may be located within a powered device (4) like a lighting device, and at least one non-dominant sensor, which may be located within another powered device (4), wherein the power distribution system is adapted such that in a system low power mode the at least one dominant sensor (6) consumes power provided by a power providing unit (3) and the at least one non-dominant sensor (6) does not consume the provided power and that the power distribution system (1) switches from the system low power mode to a system high power mode, if the at least one dominant sensor (6) has sensed an event. Since in the system low power mode the at least one non-dominant sensor does not consume power, the power consumption can be reduced.

14 Claims, 4 Drawing Sheets

(51) Int. Cl.
*H04L 12/12* (2006.01)
*H04L 12/10* (2006.01)

(56) References Cited

U.S. PATENT DOCUMENTS

| | | | |
|---|---|---|---|
| 8,106,530 | B2 | 1/2012 | Schindler |
| 9,544,976 | B2 | 1/2017 | Snyder |
| 2009/0138734 | A1* | 5/2009 | Uchida .................. G06F 1/266 |
| | | | 713/310 |
| 2010/0052421 | A1 | 3/2010 | Schindler |
| 2010/0114389 | A1 | 5/2010 | Chatterton et al. |
| 2011/0068928 | A1* | 3/2011 | Riley ................ A61B 5/02055 |
| | | | 340/573.1 |
| 2012/0147531 | A1* | 6/2012 | Rabii ................ H04W 52/0254 |
| | | | 361/679.01 |
| 2012/0271477 | A1 | 10/2012 | Okubo et al. |
| 2012/0316471 | A1* | 12/2012 | Rahman ................ G06F 1/3296 |
| | | | 600/595 |
| 2013/0147367 | A1 | 6/2013 | Cowburn |
| 2014/0006830 | A1 | 1/2014 | Kamhi et al. |

FOREIGN PATENT DOCUMENTS

| | | |
|---|---|---|
| WO | 2012127408 A1 | 9/2012 |
| WO | 2013050970 A1 | 4/2013 |

\* cited by examiner

POWER DISTRIBUTION SYSTEM WITH SELF-LEARNING LOW POWER STANDBY REDUCTION

CROSS-REFERENCE TO PRIOR APPLICATIONS

This patent application is a Divisional Application of U.S. Ser. No. 15/114,811, filed Jul. 27, 2016, which claims the priority benefit under 35 U.S.C. 371 of International Patent Application No. PCT/EP2015/050418, filed Jan. 12, 2015, which claims the priority benefit of European Application No. 14153436.2, filed Jan. 31, 2014, the contents of which are herein incorporated by reference.

FIELD OF THE INVENTION

The invention relates to a power distribution system, method and computer program for distributing power.

BACKGROUND OF THE INVENTION

A power distribution system in accordance with the Power-over-Ethernet (PoE) standard uses Ethernet cables for supplying direct current (DC) voltage from power supply equipment (PSE) to powered devices (PD) which may be lighting devices. The PoE power distribution system is often operable in a normal operation mode and in a standby mode, wherein even in the standby mode the power consumption within the PoE power distribution system can be relatively high.

U.S. Pat. No. 6,909,921 B1 discloses a home automation system comprising entry/exit sensors for detecting movement through doorways that separate rooms in a home, room motion sensors for detecting room occupancy, spot sensors to detect occupancy of specific locations within the rooms, and house status sensors to detect the status of certain parameters of the home. A central controller communicates with the sensors and controlled objects over a communications network, wherein the central controller controls the controlled objects in response to the entry/exit sensors, room motion sensors, spot sensors and the house status sensors.

WO 2013/050970 A1 discloses a network switch operable to control supply of electrical power to a network device, wherein the network switch is configured to supply power to the device upon receiving a signal destined for the device and to continue to supply the power to the device whilst successive signals from the device are received within a period being smaller than a predetermined shut off period.

WO 2012/028979 A1 discloses an apparatus for powering an electrical consumer via a data connection, wherein the apparatus comprises a power supply for supplying power to the electrical consumer via the data connection, a data receiving unit for receiving data to be sent to the electrical consumer, and a controller for activating the supply of power to the electrical consumer via the data connection, if data to be sent to the electrical consumer have been received and the supply of power to the electrical consumer is deactivated.

SUMMARY OF THE INVENTION

It is an object of the present invention to provide a power distribution system, method and computer program, which allow for reduced power consumption. It is a further object of the present invention to provide a power providing unit of the power distribution system and to provide an overall system comprising several of the power distribution systems. It is also an object of the present invention to provide an assignment providing unit for providing assignments assigning at least one sensor of the power distribution system to a dominant class and to provide an assigning method and computer program for assigning a sensor of a power distribution system to the dominant class.

In a first aspect of the present invention a power distribution system is presented, wherein the power distribution system comprises:

a power providing unit for providing power, sensors for sensing an eve, and an assignment providing unit for providing assignments assigning at least one sensor to a dominant class, thereby defining at least one dominant sensor, and assigning at least one other sensor to a non-dominant class, thereby defining at least one non-dominant sensor, wherein the power distribution system is operable in a system low power mode, in which the power distribution system consumes less power, and a system high power mode, in which the power distribution system consumes more power, wherein the power distribution system is adapted such that in the system low power mode the at least one dominant sensor consumes the provided power and the at least one non-dominant sensor does not consume the provided power and that the power distribution system switches from the system low power mode to the system high power mode, if the at least one dominant sensor has sensed an event.

Since in the system low power mode, which may be a system standby mode, only the at least one dominant sensor consumes the provided power and not also the at least one non-dominant sensor, the power consumption in the system low power mode can be reduced. In particular, the power providing unit can be adapted to provide the power only to the at least one dominant sensor in the system low power mode such that the power consumption in the system low power mode can be very low. After the event has been sensed by the at least one dominant sensor, power may also be provided to the at least one non-dominant sensor.

The power providing unit is preferentially a power providing unit in accordance with the PoE standard like the IEEE standard 802.3.af or the IEEE standard 802.3.at. It can be regarded as being PSE and it can be provided as a PoE switch having several ports to which the sensors are connected via Ethernet cables like Cat 5/6 cables. The power providing unit is preferentially adapted to supply DC voltage.

The sensors can include presence sensors for detecting the presence of persons, temperature sensors, light sensors, humidity sensors, gas sensors et cetera. A gas sensor is preferentially a $CO_2$ sensor for detecting the air quality. If a sensor is a presence sensor, the event sensed by the presence sensor is preferentially the detection of a person, wherein the presence of a person may be detected by detecting a movement. If a sensor is a temperature sensor, the event is preferentially a detection of a temperature being larger or smaller than a predefined temperature threshold. If a sensor is a light sensor, the event is preferentially a light intensity being larger or smaller than a predefined light intensity threshold. If a sensor is a humidity sensor, the event is preferentially a humidity being larger or smaller than a predefined humidity threshold. If a sensor is a gas sensor, the event is preferentially a gas concentration being larger or smaller than a predefined gas concentration threshold. The sensors are preferentially PoE sensors, i.e. preferentially they can receive power via an Ethernet cable.

The power distribution system preferentially further comprises electrical loads which are also powered by the power provided by the power providing unit at least in the system high power mode. In particular, in the system high power mode all electrical loads may be powered by the power provided by the power providing unit and in the system low power mode only few or no electrical loads may be powered by the power provided by the power providing unit, wherein a power consumed by an electrical load in the system low power mode may be lower than the power consumed by the electrical load in the system high power mode. It is also possible that in the system high power mode all electrical loads consume a higher power and in the system low power mode all electrical loads consume a lower power. The electrical loads can be light sources, air conditioning devices, et cetera. Also the electrical loads are preferentially PoE devices, i.e. devices being able to receive power via an Ethernet cable.

The sensors and electrical loads are preferentially integrated and form PDs, wherein each PD comprises a sensor and an electrical load. A PD comprising a dominant sensor may be regarded as being a dominant PD and a PD comprising a non-dominant sensor may be regarded as being a non-dominant PD.

A PD comprising a sensor and an electrical load is preferentially adapted such that it is operable in a device low power mode, in which the sensor consumes power and the electrical load consumes no power or a low power mode power, and in a device high power mode, in which the sensor consumes power and the electrical load consumes a high power mode power which, if in the device low power mode the electrical load consumes the low power mode power, is higher than the low power mode power. The low power mode power, which may be consumed by an electrical load like a light source in the device low power mode, may be used in emergency situations. The power distribution system may be adapted such that in the system low power mode a dominant PD is in its device low power mode and a non-dominant PD does not consume power, i.e., for instance, a respective port of the power providing unit, to which the PD with the non-dominant sensor is electrically connected, can be switched off.

Preferentially, the sensors and the power providing unit comprise communication units for communicating with each other, wherein the at least one dominant sensor is adapted to, if the power distribution system is in the system low power mode and if the event has been sensed by the at least one dominant sensor, communicate to the power providing unit that the event has been sensed, wherein the power providing unit is adapted to provide power also to the at least one non-dominant sensor and, if present, also to the electrical loads like the light sources, if it has been communicated to the power providing unit that the event has been sensed, in order to switch from the system low power mode to the system high power mode, wherein, if in the system low power mode a lower power, which may be regarded as being a low power mode power, has been provided to an electrical load, in the system high power mode a higher power, which may be regarded as being a high power mode power, is provided to the electrical load. The communication units are preferentially adapted to provide an Ethernet communication. However, they can also be adapted to provide another kind of communication like a wireless communication. If the sensors and the electrical loads are integrated in PDs, the PDs can comprise the communication units, wherein the communication units of the PDs can also be regarded as being communication units of the sensors and the electrical loads.

The assignment providing unit can be a storing unit, in which the assignments to the dominant and non-dominant classes are stored and from which these assignments can be retrieved for providing the same. The assignment providing unit can be a single unit, which may be integrated in another unit of the power distribution system like the power providing unit or which may be a separate unit, or the assignment providing unit can be a distributed unit comprising several assignment providing subunits integrated at least partly in different units of the power distribution system. For instance, each sensor or each PD, if the sensors are integrated in PDs, can comprise an assignment providing subunit. If an assignment providing subunit is integrated in a PD with a sensor, the assignment providing subunit of the PD may be adapted to store whether the respective PD comprises a dominant sensor or a non-dominant sensor.

The assignments to the dominant and non-dominant classes can be made manually. For instance, if the sensors are presence sensors of a room, one or several presence sensors arranged close to a door of the room can be manually assigned to the dominant class and the other presence sensors of this room can be assigned to the non-dominant class. However, the assignments to the different classes can also be automatically determined in a learning process. In particular, in an embodiment the power distribution system is further operable in a learning mode in which the sensors are powered for sensing an event and in which the learning process is performed for assigning a sensor to the dominant class, wherein the assignment providing unit is adapted to assign the sensor, which firstly senses an event after the learning process has been started, to the dominant class. The assignment providing unit may be further adapted to assign at least one further sensor to the dominant class, if the at least one further sensor has sensed an event within a predetermined time interval starting from the time of the first sensing of the event after the learning process has been started, in order to assign several sensors to the dominant class. This allows assigning several sensors, which have detected an event substantially at the same time, i.e. within the predefined time interval, to the dominant class. Also by performing the learning process several times different sensors may be assigned to the dominant class. For instance, if the sensors are presence sensors located within a room having several doors, a first presence sensor close to a first door may firstly detect the presence of a person, when the learning process is performed for the first time, and a second presence sensor, which is located close to a second door, may firstly detect the presence of a person, when the learning process is performed for the second time, wherein these presence sensors having detected a presence of a person, while the learning process was performed several times, may be assigned to the dominant class, whereas the other presence sensors may be assigned to the non-dominant class.

In an embodiment the assignments to both classes may explicit assignments, i.e. at least one sensor may be explicitly assigned to the dominant class and at least one other sensor may be explicitly assigned to the non-dominant class. In another embodiment the assignments to one of the classes may be explicit, wherein the assignments to the other of the classes may be implicit, wherein it may be defined that the at least one sensor, which has not been explicitly assigned to the one of the classes, is implicitly assigned to the other of the classes.

In a further aspect of the present invention a power providing unit for providing power to sensors of a power distribution system as defined in claim 1 is presented, wherein the power providing unit is adapted to be used by the power distribution system. Moreover, in an aspect of the present invention an assignment providing unit is presented, which is adapted to provide assignments assigning at least one sensor of the power distribution system as defined in claim 1 to a dominant class, thereby defining at least one dominant sensor, and assigning at least one other sensor of the power distribution system to a non-dominant class, thereby defining at least one non-dominant sensor, wherein the assignment providing unit is adapted to be used by the power distribution system.

In another aspect of the present invention an overall system comprising several power distribution systems as defined in claim 1 is presented, wherein the sensors of different power distribution systems of the overall system are arranged in different spatial regions. For instance, the spatial regions can correspond to different rooms, hallways, open office areas, different spatial regions within a same open office area, et cetera of a building, wherein the sensors of, for instance, a room or a hallway are the sensors of a respective power distribution system, which may also be regarded as being a subsystem of the overall system of the building. The different power distribution systems, i.e. the subsystem of the overall system, may comprise at least partly the same power providing units, which may be regarded as being integrated power providing units providing power to sensors of different spatial areas, i.e. of different power distribution systems, or all power distribution systems may comprise their respective separate own power providing unit. For each spatial region, i.e. for instance, for each room or hallway at least one dominant sensor may be determined. The power distribution systems may further comprise electrical loads, wherein the sensors and the electrical loads of different power distribution systems of the overall system are arranged in different spatial regions.

In a further aspect of the present invention a power distribution method for distributing power within a power distribution system as defined in claim 1 is presented, wherein the power distribution method comprises:
consuming, in the system low power mode, power by the at least one dominant sensor and not by the at least one non-dominant sensor,
switching the power distribution system from the system low power mode to the system high power mode, if the at least one dominant sensor has sensed an event.

In another aspect of the present invention an assigning method for assigning a sensor of a power distribution system as defined in claim 1 to a dominant class is presented, wherein the assigning method comprises:
operating the power distribution system in a learning mode in which the sensors are powered for sensing an event,
starting a learning process for assigning at least one sensor to the dominant class,
assigning a sensor, which firstly senses an event after the learning process has been started, to the dominant class.

In a further aspect of the present invention a computer program for distributing power within a power distribution system is presented, wherein the computer program comprises program code means for causing the power distribution system to carry out the steps of the power distribution method, when the computer program is run on a computer controlling the power distribution system.

In another aspect of the present invention a computer program for assigning a sensor of a power distribution system to a dominant class is presented, wherein the computer program comprises program code means for causing the power distribution system to carry out the steps of the assigning method, when the computer program is run on a computer controlling the power distribution system.

It shall be understood that the claims have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings.

DETAILED DESCRIPTION OF EMBODIMENTS

Figure 1:
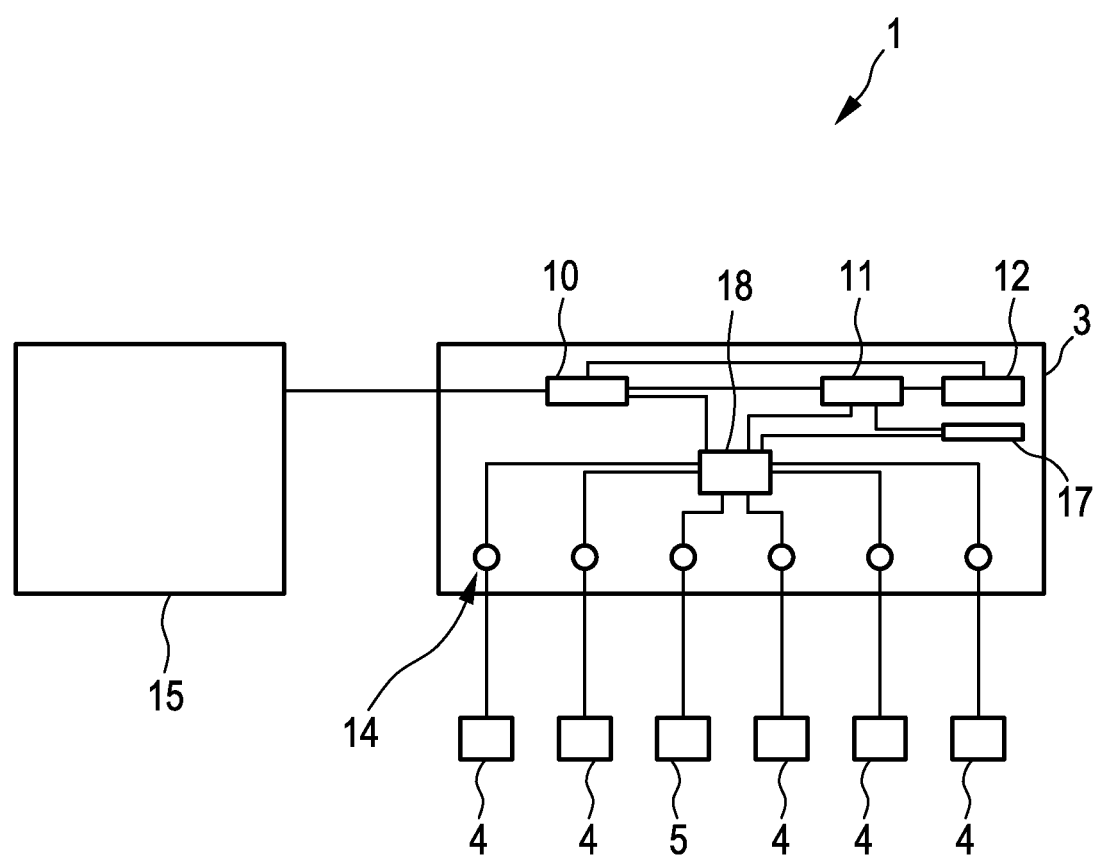
FIG. 1 shows schematically and exemplarily an embodiment of a power distribution system.

FIG. 1 shows schematically and exemplarily an embodiment of a power distribution system. The power distribution system 1 comprises a power providing unit 3 being, in this embodiment, a PoE switch having several ports 14. The PoE switch 3 comprises a PSU 10, which is adapted to receive power from an external power source 15 like a mains power source of a building and to transform the received power to DC power to be supplied to PDs 4 and other electrical consumers 5. The PoE switch 3 further comprises a power distribution unit 18 for distributing the power provided by the PSU 10 among the ports 14, a communication unit 17 for providing Ethernet communication, an assignment providing unit 12 which will be described further below and a controller 11 for controlling the different components of the PoE switch 3. The PoE switch 3 can comprise further components, which are not shown in FIG. 1 for clarity reasons.

Figure 2:
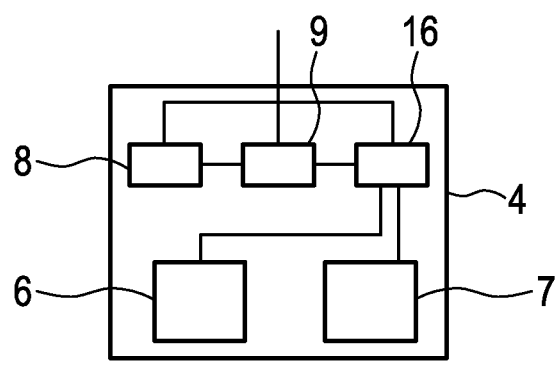
FIG. 2 shows schematically and exemplarily an embodiment of a PD of the power distribution system.

FIG. 2 shows schematically and exemplarily an embodiment of a PD 4. The PD 4 comprises a presence sensor 6 and a light source 7 driven by a driver 16. The PD 4 further comprises a communication unit 8 for providing Ethernet communication and a controller 9 for controlling the different components of the PD 4. The presence sensor 6 is preferentially connected with the driver 16 via a power line and a communication bus, wherein the presence sensor 6 is adapted to communicate to the controller 9 via the driver 16 that a presence event has been detected. The presence sensor 6 can also be adapted to communicate the presence event to the controller 9 by using another communication path, for instance, a direct communication path between the presence detector 6 and the controller 9, which is preferentially wired, but which may also be wireless. Also the PD 4 can comprise further components which are not shown in FIG. 2 for clarity reasons. The electrical consumer 5 indicated in FIG. 1 is a simple light source in this embodiment, i.e. a light source without an additional presence sensor.

The assignment providing unit 12 is adapted to provide assignments assigning one or several sensors 6 of the PDs 4 to a dominant class, thereby defining one or several dominant sensors 6 and corresponding one or several dominant PDs 4, and assigning the other sensors 6 to a non-dominant class, thereby defining non-dominant sensors 6 and corresponding non-dominant PDs 4. The electrical consumer 5, which does not have a sensor, is also assigned to the non-dominant class.

The power distribution system 1 is operable in a system low power mode and a system high power mode, wherein the power distribution system 1 is adapted such that in the system low power mode the one or several dominant sensors 6 consume power provided by the PoE switch 3 and the non-dominant sensors 6, the light sources 7 and the electrical consumer 5 do not consume power and such that in the system high power mode all sensors 6, the light sources 7 and the electrical consumer 5 consume the power provided by the PoE switch 3. In another embodiment at least some of the light sources 7 may consume relatively low power, which may be regarded as being low power mode power, in the system low power mode, in order to provide an emergency lighting, wherein in the system high power mode a higher power, which may be regarded as being a high power mode power, may be consumed by the light sources 7. The power distribution system 1 is further adapted to switch from the system low power mode to the system high power mode, if a dominant sensor 6 has sensed an event.

The PDs 4 are preferentially adapted to be operable in a device low power mode, in which the respective sensor 6 consumes power and the respective light source 7 does not consume power, and in a device high power mode, in which the respective sensor 6 consumes power and the respective light source 7 also consumes power. In another embodiment at least one of the PDs 4 may be adapted such that in the device low power mode the respective light source 7 consumes a lower power, which may be the low power mode power, and in the device high power mode the respective light source 7 consumes a higher power, which may be the high power mode power, in order to provide also in the device low power mode some emergency lighting. The power distribution system 1 is preferentially adapted such that in the system low power mode the one or several dominant PDs 4 are in their device low power modes and the non-dominant PDs 4 do not consume any power. In particular, the PoE switch 3 is preferentially adapted such that in the system low power mode only the ports 14 receive power, which are connected to a dominant PD 4, wherein the power provided to the respective port 14 in the system low power mode corresponds to the power required by the respective dominant sensor 6.

In this embodiment, if the power distribution system is in the system low power mode and if a person has been detected by a dominant presence sensor 6, the communication unit 8 of the respective dominant PD 4 communicates to the PoE switch 3 that the person has been detected, wherein the PoE switch 3 is adapted to provide power to all PDs 4 and to the electrical consumer 5, if it has been communicated to the PoE switch 3 that a person has been detected. Moreover, that a person has been detected is also communicated to the other PDs 4, whereupon the other PDs 4 are switched on. When all PDs 4 and the electrical consumer 5 are switched on, the power distribution system is in its system high power mode.

The power distribution system 1 is operable in a learning mode in which the sensors 6 are powered for sensing an event, i.e. in this embodiment for detecting a person, and in which a learning process is performed for assigning a sensor 6 to the dominant class, wherein the assignment providing unit 12 is adapted to assign the sensor 6, which firstly senses an event after the learning process has been started, to the dominant class. The assignment providing unit 12 is preferentially further adapted to assign at least one further sensor 6 to the dominant class, if the at least one further sensor 6 has sensed an event within a predetermined time interval starting from the time of the first sensing of the event after the learning process has been started, in order to assign several sensors 6 and thus several PDs 4 to the dominant class. The power distribution system 1 is preferentially adapted to perform the learning process several times, in order to assign different sensors 6 and thus different PDs 4 to the dominant class.

The power distribution system 1 is preferentially a subsystem of an overall system comprising several power distribution systems. In particular, the power distribution system 1 may be adapted to provide power to PDs 4 and an electrical consumer 5 arranged within a hallway 2 of a building, whereas other power distribution systems or subsystems of the overall system may be used for distributing the power within other spatial regions, i.e. other rooms, of the building as schematically and exemplarily illustrated in FIG. 3.

Figure 3:
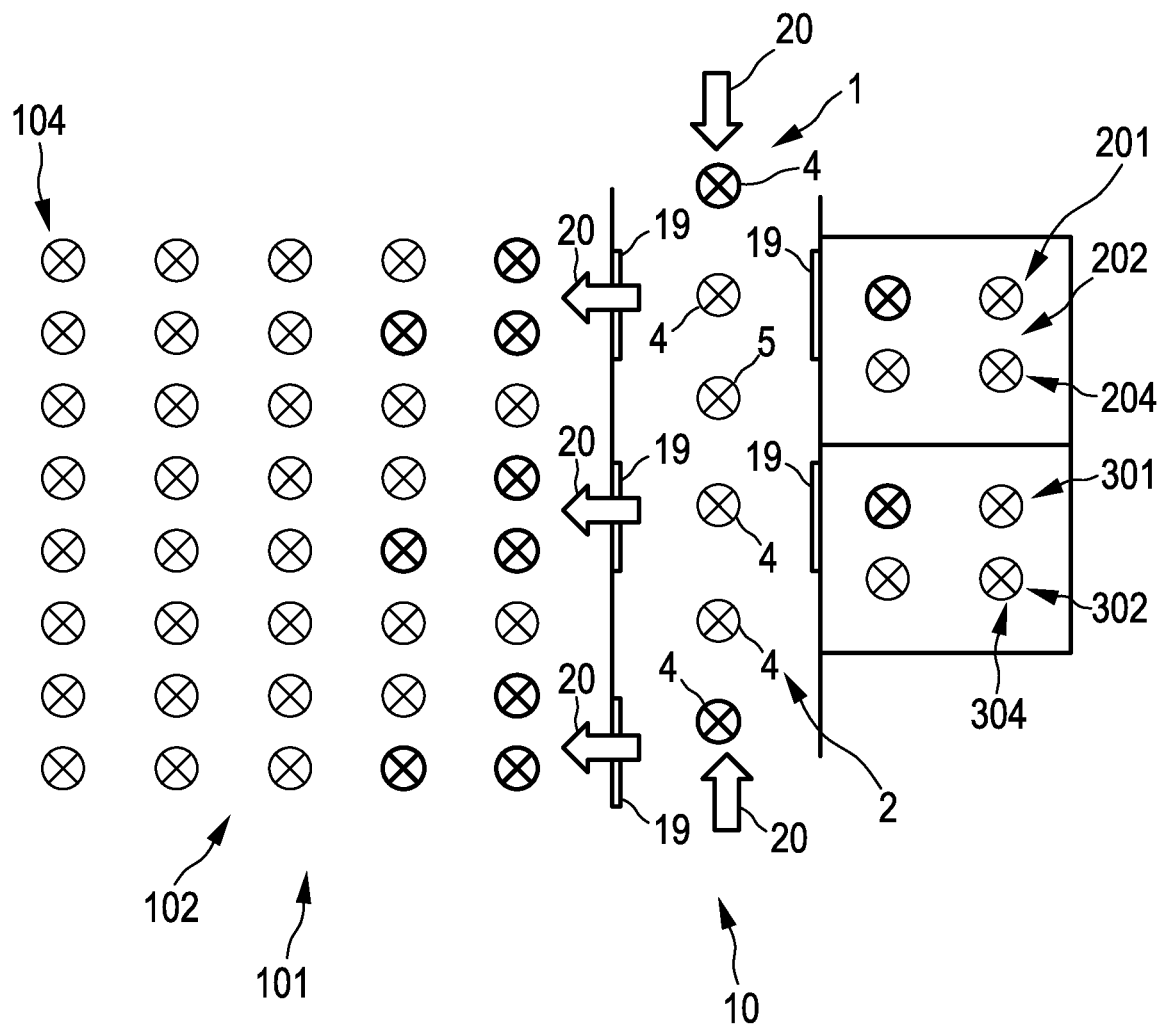
FIG. 3 illustrates dominant and non-dominant PDs in different areas within a building.

FIG. 3 schematically and exemplarily illustrates the hallway 2 with doors 19 and rooms 102, 202, 302 of a building 10. A first room 102 comprises PDs 104, a second room 202 comprises PDs 204 and a third room 302 comprises PDs 304. The PDs 104, 204, 304 are similar to the PDs 4 described above with reference to FIGS. 1 and 2. The PDs 104, 204, 304 in the respective rooms 102, 202, 302 can be PDs of a respective power distribution system 101, 201, 301, which may be similar to the power distribution system 1 described above with reference to FIG. 1, i.e. the respective PDs of the respective room can be connected to a respective power providing unit, wherein the respective power distribution system of the respective room can be operable in a system low power mode and in a system high power mode, wherein the respective power distribution system of the respective room can be adapted such that in the system low power mode the at least one dominant sensor of the at least one PD consumes the provided power and the non-dominant sensors of the non-dominant PDs and the light sources of the PDs consume no power or a relatively low power and such that in the system high power mode the light sources of the PDs consume power, which, if the light sources have consumed the relative low power in the system low power mode, is higher than the relative low power. Preferentially, in the system high power mode also all sensors of the respective power distribution system, i.e. of the respective room, are switched on. The respective power distribution system 101, 201, 301 is further adapted to switch from the system low power mode to the system high power mode, if the at least one dominant sensor of the respective PD 104, 204, 304 has sensed an event. In FIG. 3 some events, i.e. an approaching and a corresponding detection of a person, are indicated by arrows 20. The PDs 4, 104, 204, 304 close to the doors 19 are dominant PDs, whereas the other PDs 4, 104, 204, 304 are non-dominant PDs.

Figure 4:
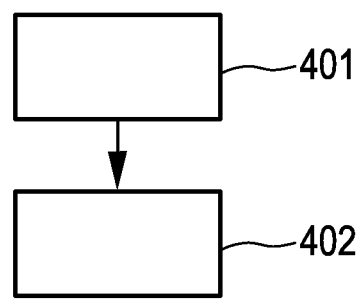
FIG. 4 shows a flowchart exemplarily illustrating an embodiment of a power distribution method for distributing power within the power distribution system.

In the following an embodiment of a power distribution method for distributing power within the power distribution system 1 will exemplarily be described with reference to a flowchart shown in FIG. 4.

In step 401 the power distribution system 1 is in the system low power mode and power is provided only to the ports 14, to which dominant PDs 4 are connected, wherein the dominant PDs 4 are operated in their device low power mode. Thus, in step 401 only the dominant sensors 6 of the dominant PDs 4 receive power.

In step 402 the presence of a person is detected by a dominant sensor 6 and the power distribution system is switched from the system low power mode to the system high power mode. In particular, after a dominant sensor 6 has sensed the presence of a person, the communication unit 8 of the corresponding PD 4 communicates this detection of the person to the power providing unit 3 and to the other PDs 4, whereupon the power providing unit 3 provides power to all ports 14, to which the PDs 4 and the electrical consumer 5 are connected, and the light sources 7 and the sensors 6 of the PDs 4 are switched on.

Figure 5:
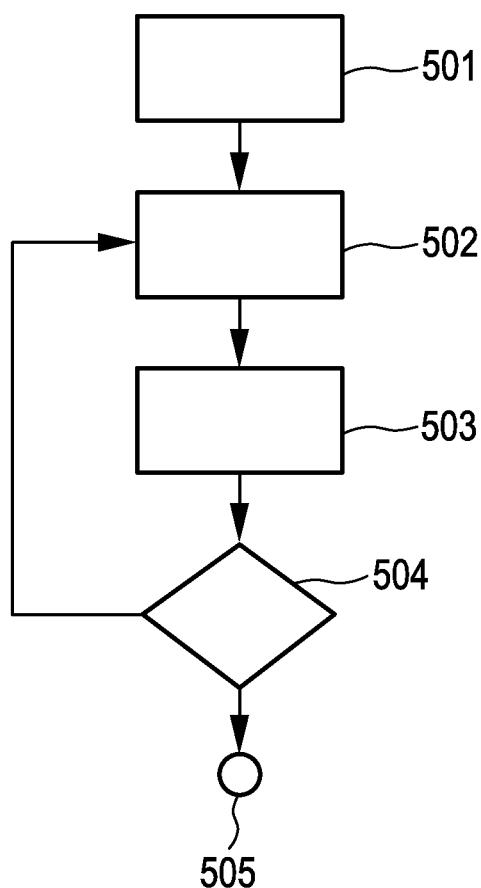
FIG. 5 shows a flowchart exemplarily illustrating an embodiment of an assigning method for assigning a sensor of the power distribution system to a dominant class.

In the following an embodiment of an assigning method for assigning sensors of the power distribution system 1 to dominant classes and to non-dominant classes will exemplarily be described with reference to a flowchart shown in FIG. 5.

In step 501 the power distribution system 1 is operated in its learning mode in which the sensors 6 are powered for sensing an event. In particular, all PDs 4 of the power distribution system 1 are operated in their device low power mode or in their device high power mode.

In step 502 a learning process for assigning a sensor 6 to a dominant class is started and in step 503 the sensor 6, which firstly senses an event after the learning process has been started, and thus correspondingly the PD 4 are assigned to the dominant class. In step 504 it is determined whether an abort criterion has been fulfilled. The abort criterion is, for instance, whether a user has indicated that the assigning method should stop by using an input unit like a button on, for instance, the power providing unit 3. Another abort criterion might be whether the learning process has been repeated a given number of times. If the abort criterion is fulfilled, the assigning method ends in step 505. Otherwise, the assigning method continues with step 502.

PoE is an IEEE standard which allows supplying DC voltage over low costs Cat 5/6 cables. In the power distribution system 1 described above with reference to FIG. 1 the PDs 4 and the electrical consumer 5 are therefore preferentially connected to the ports 14 via Cat 5/6 cables. The current IEEE standard 802.3.at allows for a delivered PD power of 25.5 W at 42.5 V to 57 V.

Known PoE lighting systems comprising a PoE switch as power providing unit and PDs with presence sensors and light sources powered by the PoE switch can be operated in a standby mode and in a normal operational mode. In the standby mode the light sources of the PDs are switched off or dimmed to zero light output and only the presence sensors of the PDs and processing parts of the PDs are still or partly functional, wherein the partial functionality of the presence sensors and the processing parts can correspond to a sleep mode of the respective PDs. If a presence sensor detects a movement, i.e. a presence of a person, the PoE system will be activated by switching from the standby mode to the normal operation mode, in which all light sources of the PDs are switched on and provide a maximum light output.

Even in the standby mode the power consumption of the known PoE systems is relatively high. For instance, if 22 W are provided to a PSU of a PoE switch having 12 ports, to which 12 PDs are connected, and having a switch consuming 1 W and a PoE controller consuming 4 W, wherein the PSU has an efficiency of 50 percent, i.e. provides 11 W in this example, and wherein each PD has a maximal standby power requirement of 0.5 W, from the initial 22 W 10 W are used for the PoE switch and 12 W are used for the 12 PDs in the standby mode. Thus, in the standby mode the power consumption is about 1.8 W per port (22 W divided by 12 ports) in the exemplarily described prior art PoE system. If, for instance, 6000 PDs are assumed in a building, this corresponds to a very high overall standby power consumption of about 10.8 kW. The power distribution systems described above with reference to FIGS. 1 to 3 are therefore configured to reduce the standby power of the total system, wherein it is learnt which sensors are the most dominant sensors. If different areas like different rooms of a building are defined, in each area one or several most dominant sensors may be determined by the learning procedure, which can then be used to reduce the standby power of the total system.

In the system low power mode, which can also be regarded as being a standby mode, not all sensors have to stay active, but only the dominant sensors. All PDs, which do not comprise a dominant sensor, can be put in power down by disabling the respective ports of the PoE switch in the standby mode, wherein some components of the PoE switch may still be active like, for instance, a switch part, the PSU, et cetera. If a movement, i.e. a presence of a person, is detected by a dominant presence sensor, all PDs may be activated by communication via the PoE switch, wherein the PDs will be powered by enabling the corresponding ports of the PoE switch. The power distribution system is preferentially adapted to perform this activation and enabling procedure relatively fast, for instance, within 0.5 s.

A dominant sensor in a certain area, which is active during the system low power mode, is preferentially a presence sensor that detects a presence of a person at first in an area. This could be a sensor close to, for instance, an entrance, a hallway, et cetera. Due to detection area spread of the sensors it is possible that more than one sensor detect movements at more or less the same time. Thus, several sensors of a same area may be assigned to the dominant class. The assignments can be stored, for instance, in the PoE switch or in the respective PD comprising the respective sensor which has been assigned to the dominant class or to the non-dominant class.

When the assigning method for assigning sensors of the power distribution system to dominant classes and to non-dominant classes is performed, all PDs are preferentially in their device low power mode, which may also be regarded as being a device standby mode, in which only the respective sensor consumes power and not the respective light source. The most dominant one or several sensors in an area are then preferentially determined by determining the first one or several sensors detecting a movement, i.e. detecting a presence of a person within the area. The other sensors in this area are regarded as being non-dominant sensors. Electrical consumers like lighting devices, which do not have a presence sensor, are preferentially automatically assigned to the non-dominant class. The assignments are stored, for instance, in the respective PD and/or in the PoE switch, wherein performing these assignment procedures, i.e. the learning procedure, and the storing of the determined assignments can be repeated several times. After the assignments have been determined, i.e. after the learning, in the system low power mode the PDs with a dominant sensor in an area can be in their device low power modes, i.e. in their device standby modes, and the PDs, which do not have a dominant sensor, can be in a power down mode. If a dominant sensor in a PD detects a movement, the light source of the PD, which comprises the dominant sensor, is preferentially switched on and a power enable command is preferentially broadcast to all PDs, whereupon all light sources are switched on and the power distribution system operates in its normal operation mode, i.e. in the system high power mode.

If in an example, which is similar to the above described example of a prior art PoE system, a PoE switch comprises a PSU having an efficiency of 50 percent, a switch consuming 1 W, a controller consuming 4 W and 12 ports, to which 12 PDs are connected, wherein each PD has a maximum standby power requirement of 0.5 W, and if only one of the PDs is a dominant PD with a dominant sensor, in the system standby mode, i.e. in the system low power mode, the PSU needs to provide 5.5 W only such that to the PSU 11 W need to be provided, which corresponds to a power consumption of about 0.9 W per port (11 W divided by 12 ports). If in an example a building comprises 6000 PDs, this corresponds to an overall standby power consumption of about 5.4 kW. Thus, in comparison to the standby power consumption of 10.8 kW, which has been calculated above for the prior art PoE system, the standby power consumption can be reduced by percent in this example.

Although in above described embodiments the sensors are presence sensors, in other embodiments the power distribution system can alternatively or additionally comprise other kind of sensors like temperature sensors, light intensity sensors, humidity sensor, gas sensors, especially $CO_2$ sensors, et cetera.

Although in above described embodiments the sensors are integrated in PDs, in other embodiments one, several or all sensors may be separate sensors, which are not integrated in a PD like a lighting PD.

Although in the embodiment described above with reference to FIG. 1 the assignment providing unit is integrated in the power providing unit, i.e. in the described embodiment in the PoE switch, in other embodiments the assignment providing unit can also be a separate unit being separate from the power providing unit, or it can be integrated in another device, for instance, in a PD. The assignment providing unit can be a single unit or it can be a distributed unit comprising several assignment providing subunits, which may be adapted to communicate to each other and which may be integrated in other devices like the PDs. Also the controller of the power providing unit may not be integrated with the power providing unit, but it may be outside of power providing unit and may be adapted to communicate with the power providing unit, in order to control the same. In an embodiment, the controller of the power providing unit and the assignment providing unit are both integrated in a single unit, which could be regarded as being an area controller or a floor controller and which is separate from the power providing unit. For instance, if the power distribution system is in its system low power mode and if a person has been detected by a dominant sensor integrated in a dominant PD, the communication unit of the dominant PD may communicate to the external area controller that the person has been detected, whereupon the area controller can communicate to the power providing unit that power should be provided to all PDs and also to optional further electrical consumers, which may be connected to the power providing unit, and the area controller can communicate to the PDs that they should be switched into their device high power modes.

Although in above described embodiments the electrical loads of the power distribution system are light sources, in other embodiments the electrical loads can also be other electrical devices like air conditioning devices.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the assignments of the sensors to the dominant and non-dominant classes, the provision of the power for the power distribution systems et cetera performed by one or several units or devices can be performed by any other number of units or devices. These procedures and the control of the power distribution system in accordance with the power distribution method and/or in accordance with the assigning method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a power distribution system, especially a PoE system, comprising at least one dominant sensor, which may be located within a powered device like a lighting device, and at least one non-dominant sensor, which may be located within another powered device, wherein the power distribution system is adapted such that in a system low power mode the at least one dominant sensor consumes power provided by a power providing unit and the at least one non-dominant sensor does not consume the provided power and that the power distribution system switches from the system low power mode to a system high power mode, if the at least one dominant sensor has sensed an event. Since in the system low power mode the at least one non-dominant sensor does not consume power, the power consumption can be reduced.

The invention claimed is:

1. A system comprising:
a plurality of power distribution systems for distributing power to respective spatial region, each power distribution system including,
a power providing unit for providing power,
sensors for sensing an event,
an assignment providing unit for providing assignments assigning at least one sensor to a dominant class, thereby defining at least one dominant sensor, and assigning at least one other sensor to a non-dominant class, thereby defining at least one non-dominant sensor,
wherein the power distribution system is operable in a system low power mode, in which the power distribution system consumes less power, and a system high power mode, in which the power distribution system consumes more power, wherein the power distribution system is adapted such that in the system low power mode the at least one dominant sensor consumes the provided power and the at least one non-dominant sensor does not consume the provided power and that the power distribution system switches from the system low power mode to the system high power mode, if the at least one dominant sensor has sensed an event;

wherein when the power distribution system is in the system low power mode power from the power providing unit to the at least one non-dominant sensor is switched off; and wherein when the power distribution system is in the system high power mode power from the power providing unit to the at least one dominant sensor and the at least one non-dominant sensor are both switched on;

wherein each power distribution system assigns a respective at least one dominant sensor, and at least one other sensor to a non-dominant class, based on a respective spatial region.

2. The system as defined in claim 1, wherein the sensors include a presence sensor and/or a temperature sensor and/or a light sensor and/or humidity sensor and/or a gas sensor.

3. The system as defined in claim 1, wherein the power distribution system further comprises electrical loads being adapted to consume the power provided by the power providing unit, wherein the electrical loads include a light source and/or an air conditioning device.

4. The system as defined in claim 1, wherein the power distribution system further comprises electrical loads being adapted to consume the power provided by the power providing unit, wherein at least one sensor is integrated with at least one electrical load.

5. The system as defined in claim 1, wherein the power distribution system is further operable in a learning mode in which the sensors are powered for sensing an event and in which a learning process is performed for assigning a sensor to the dominant class, wherein the assignment providing unit is adapted to assign a sensor, which firstly senses an event after the learning process has been started, to the dominant class.

6. The system as defined in claim 5, wherein the assignment providing unit is further adapted to assign at least one further sensor to the dominant class, if the at least one further sensor has sensed an event within a predetermined time interval starting from the time of the first sensing of the event after the learning process has been started, in order to assign several sensors to the dominant class.

7. The system as defined in claim 5, wherein the power distribution system is adapted to perform the learning process several times, in order to assign different sensors to the dominant class.

8. A power providing unit for providing power to sensors of the system as defined in claim 1, wherein the power providing unit is adapted to be used by the system.

9. An assignment providing unit for providing assignments assigning at least one sensor of the system as defined in claim 1 to a dominant class, thereby defining at least one dominant sensor, and assigning at least one other sensor of the system to a non-dominant class, thereby defining at least one non-dominant sensor, wherein the assignment providing unit is adapted to be used by the system.

10. A power distribution method for distributing power within a system as defined in claim 1, wherein the power distribution method comprises:
in each power distribution system,
consuming, in the system low power mode, power by the at least one dominant sensor and not by the at least one non-dominant sensor,
switching the power distribution system from the system low power mode to the system high power mode, if the at least one dominant sensor has sensed an event.

11. A non-transitory computer readable medium having a program for distributing power within a power distribution method as defined in claim 10, the computer program comprising program code for causing the system to carry out the steps of the power distribution method when the computer program is run on a computer controlling the power distribution system.

12. An assigning method for assigning a sensor of the system as defined in claim 1 to a dominant class, wherein the assigning method comprises:
operating the system in a learning mode in which the sensors are powered for sensing an event,
starting a learning process for assigning a sensor to the dominant class,
assigning a sensor, which firstly senses an event after the learning process has been started, to the dominant class.

13. A non-transitory computer readable medium having a program for assigning a sensor of a power distribution method as defined in claim 12 to a dominant class, the computer program comprising program code for causing the system to carry out the steps of the assigning method when the computer program is run on a computer controlling the power distribution system.

14. The system as defined in claim 1, wherein the assignment providing unit assigns at least one sensor to a dominant class based on the spatial location of the at least one sensor.

* * * * *